US009633086B2

(12) United States Patent
Coldicott et al.

(10) Patent No.: US 9,633,086 B2
(45) Date of Patent: Apr. 25, 2017

(54) GOAL-ORIENTED USER MATCHING AMONG SOCIAL NETWORKING ENVIRONMENTS

(71) Applicant: International Business Machines Corporation, Armonk, NY (US)

(72) Inventors: Peter A. Coldicott, Jonestown, TX (US); Eoin Lane, Littleton, MA (US); Brendan J. McCormick, Wilmington, DE (US); Mei Y. Selvage, Portland, ME (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/046,773

(22) Filed: Feb. 18, 2016

(65) Prior Publication Data

US 2016/0162495 A1 Jun. 9, 2016

Related U.S. Application Data

(63) Continuation of application No. 13/344,042, filed on Jan. 5, 2012, now Pat. No. 9,298,826.

(51) Int. Cl.
*G06F 17/30* (2006.01)
*G06Q 10/10* (2012.01)
*G06Q 50/00* (2012.01)

(52) U.S. Cl.
CPC .... *G06F 17/3053* (2013.01); *G06F 17/30312* (2013.01); *G06F 17/30477* (2013.01);
(Continued)

(58) Field of Classification Search
None
See application file for complete search history.

(56) References Cited

U.S. PATENT DOCUMENTS 5,963,951 A 10/1999 Collins
8,019,743 B2 9/2011 Ebanks
(Continued)

FOREIGN PATENT DOCUMENTS

EP 1 898 317 A1 3/2008

OTHER PUBLICATIONS

Donald Lefebvre, PCT International Search Report, International Application No. PCT/CA2012/050933, Date of Mailing Mar. 25, 2013, 4 pages.
(Continued)

*Primary Examiner* — Hosain Alam
*Assistant Examiner* — Tuan-Khanh Phan
(74) *Attorney, Agent, or Firm* — Isaac J. Gooshaw; Maxine L. Barasch; Keohane & D'Alessandro PLLC (57) ABSTRACT

Embodiments of the present invention provide an approach for goal-based user matching among social networking environments. In a typical embodiment, a querying user is asked to respond to a series of questions related to goals, criteria, and criteria priorities (and, optionally, a desired "degree" of separation among other users). The querying user will submit his/her responses, which are then parsed and prioritized accordingly. Based on the responses, social networking sites are then searched to identify a set (e.g., at least one) of candidate users that are potential collaboration partners with the querying user. This set of candidate users may be arranged in a list and sorted according to a best match to the querying user's responses. The list can then be provided to the querying user. In addition, invites can be sent to the set of candidate users to invite such users to connect/collaborate with the querying user.

17 Claims, 5 Drawing Sheets

(52) U.S. Cl.
CPC ....... *G06F 17/30864* (2013.01); *G06Q 10/10* (2013.01); *G06Q 50/01* (2013.01)

(56) References Cited

U.S. PATENT DOCUMENTS

| | | |
|---|---|---|
| 2002/0032723 A1 | 3/2002 | Johnson et al. |
| 2002/0059201 A1 | 5/2002 | Work |
| 2005/0021750 A1 | 1/2005 | Abrams |
| 2006/0129551 A1 | 6/2006 | Teicher |
| 2006/0265268 A1 | 11/2006 | Hyder et al. |
| 2007/0226248 A1 | 9/2007 | Darr |
| 2007/0282621 A1* | 12/2007 | Altman .................. G06Q 10/10 705/319 |
| 2008/0195600 A1 | 8/2008 | Deakter |
| 2010/0174709 A1 | 7/2010 | Hansen et al. |
| 2011/0191371 A1 | 8/2011 | Elliott |
| 2011/0211764 A1 | 9/2011 | Krupka et al. |
| 2011/0302097 A1 | 12/2011 | Lonkar et al. |
| 2012/0124176 A1* | 5/2012 | Curtis .................... G06Q 50/01 709/219 |
| 2012/0166452 A1 | 6/2012 | Tseng |
| 2012/0239486 A1 | 9/2012 | Hu et al. |
| 2013/0179438 A1 | 7/2013 | Coldicott et al. |

OTHER PUBLICATIONS

Maitland, J., "Keeping Control Isn't Easy", Chapter 4: Cloud-Based Infrastructure, SearchCloudComputing.com, Oct. 2009, 17 pages.

Mell et al., "The NIST Definition of Cloud Computing", National Institute of Standards and Technology, Information Technology Laboratory, Version 15, Oct. 7, 2009, 2 pages.

Dirks et al., "Smarter Cities for Smarter Growth: How cities can optimize their systems for the talent-based economy", IBM Global Business Services, May 2010, 24 pages.

Tuankhanh D. Phan, USPTO Office Action, U.S. Appl. No. 13/344,042, Notification Date Jan. 26, 2015, 16 pages.

Tuankhanh D. Phan, USPTO Final Office Action, U.S. Appl. No. 13/344,042, Notification Date Jul. 15, 2015, 14 pages.

Tuankhanh D. Phan, USPTO Notice of Allowance and Fee(s) Due, U.S. Appl. No. 13/344,042, Date Mailed Dec. 21, 2015, 15 pages.

* cited by examiner

| | JOE | MARY |
|---|---|---|
| | EXPERTISE: YES | EXPERTISE: YES |
| | 100 (EXPERIENCE IN AUTHORING ARTICLES) | 100 (EXPERIENCE IN AUTHORING ARTICLES) |
| | 100 (WORK FOR COMPANY "A") | 0 (WORK FOR COMPANY "B") |
| | SUM OF WEIGHT: 200 | SUM OF WEIGHT: 100 |
| | % OF THE LIKELIHOOD: 200 OF THE INDIVIDUAL SCORE /200 OF THE TOTAL SCORE = 100% | % OF THE LIKELIHOOD: 100 OF THE INDIVIDUAL SCORE /200 OF THE TOTAL SCORE = 50% |

FIG. 5

GOAL-ORIENTED USER MATCHING AMONG SOCIAL NETWORKING ENVIRONMENTS

CROSS REFERENCE TO RELATED APPLICATION

The present patent document is a continuation of U.S. patent application Ser. No. 13/344,042, filed Jan. 5, 2012, and titled "GOAL-ORIENTED USER MATCHING AMONG SOCIAL NETWORKING ENVIRONMENTS", the disclosure of which is incorporated herein by reference.

TECHNICAL FIELD

In general, the present invention relates to social networking user matching. Specifically, embodiments of the present invention relate to goal-oriented user matching among social networking environments.

BACKGROUND

Social networking software has been increasingly adopted as a main driving force behind making business and/or personal connections. A social network is a social structure made up of individuals (or organizations) called "nodes", which are connected by one or more specific types of interdependency, such as friendship, kinship, common interest, financial exchange, dislike, or relationships of knowledge. Social network analysis (SNA) views social relationships in terms of network theory consisting of nodes and ties (also called edges, links, or connections). Nodes are the individual user, actors, and/or groups within the networks, and ties are the relationships between the actors. The resulting graph-based structures are often very complex. There can be many kinds of ties between the nodes. Research in a number of academic fields has shown that social networks operate on many levels, from families up to the level of nations, and play a critical role in determining the way problems are solved, organizations are run, and the level to which individuals succeed in achieving their goals. In its simplest form, a social network is a map of specified ties, such as friendship, between the nodes being studied. The nodes to which an individual is thus connected are the social contacts of that individual. The network can also be used to measure social capital (i.e., the value that an individual gets from the social network). These concepts are often displayed in a social network diagram, where nodes are the points and ties are the lines.

SUMMARY

Embodiments of the present invention provide an approach for goal-based user matching among social networking environments. In a typical embodiment, a querying user is asked to respond to a series of questions related to goals, criteria, and criteria priorities (and, optionally, a desired "degree" of separation among other users). The querying user will submit his/her responses, which are then parsed and prioritized accordingly. Based on the responses, social networking sites are then searched to identify a set (e.g., at least one) of candidate users that are potential collaboration partners with the querying user. This set of candidate users may be arranged in a list and sorted according to a best match to the querying user's responses. The list can then be provided to the querying user. In addition, invites can be sent to the set of candidate users to invite such users to connect/collaborate with the querying user.

A first aspect of the present invention provides a method for matching users among social networking environments. The method comprises a processor receiving one or more goals from a querying user and storing the one or more goals in an electronic storage medium. The method further comprises the processor providing one or more selection criteria to the querying user. The method further comprises the processor receiving a response to at least one of the one or more selection criteria and storing the response in the electronic storage medium. The method further comprises the processor prioritizing the one or more selection criteria based on the response. The method further comprises the processor searching a set of social networks based on the set of goals and the prioritized selection criteria for a set of candidate users to collaborate with the querying user in achieving the one or more goals. The method further comprises the processor ranking the set of candidate users based on a likelihood of each candidate user the set of candidate users matching the set of goals and the response.

A second aspect of the present invention provides a system for matching users among social networking environments. The system comprises a bus, a computer-readable storage device coupled to the bus, and a processor coupled to the bus. The system further comprises program instructions, stored on the computer-readable storage device for execution by the processor, to receive one or more goals from a querying user and store the one or more goals in an electronic storage medium. The system further comprises program instructions, stored on the computer-readable storage device for execution by the processor, to provide one or more selection criteria to the querying user. The system further comprises program instructions, stored on the computer-readable storage device for execution by the processor, to receive a response to at least one of the one or more selection criteria and store the response in the electronic storage medium. The system further comprises program instructions, stored on the computer-readable storage device for execution by the processor, to prioritize the one or more selection criteria based on the response. The system further comprises program instructions, stored on the computer-readable storage device for execution by the processor, to search a set of social networks based on the set of goals and the prioritized selection criteria for a set of candidate users to collaborate with the querying user in achieving the one or more goals. The system further comprises program instructions, stored on the computer-readable storage device for execution by the processor, to rank the set of candidate users based on a likelihood of each candidate user in the set of candidate users matching the set of goals and the response.

A third aspect of the present invention provides a computer program product for matching users among social networking environments. The computer program product comprises a computer-readable storage device. The computer program product further comprises program instructions, stored on the computer-readable storage device, to receive one or more goals from a querying user and store the one or more goals in an electronic storage medium. The computer program product further comprises program instructions, stored on the computer-readable storage device, to provide one or more selection criteria to the querying user. The computer program product further comprises program instructions, stored on the computer-readable storage device, to receive a response to at least one of the one or more selection criteria and store the response in the electronic storage medium. The computer program product further comprises program instructions, stored on the computer-readable storage device, to prioritize the one or more selection criteria based on the response. The computer program product further comprises program instructions, stored on the computer-readable storage device, to search a set of social networks based on the set of goals and the prioritized selection criteria for a set of candidate users to collaborate with the querying user in achieving the one or more goals. The computer program product further comprises program instructions, stored on the computer-readable storage device, to rank the set of candidate users based on a likelihood of each candidate user in the set of candidate users matching the set of goals and the response.

A fourth aspect of the present invention provides a method for deploying a system for matching users among social networking environments. The method comprises a computer system providing a computer infrastructure being operable to: receive one or more goals from a querying user and store the one or more goals in an electronic storage medium; provide one or more selection criteria to the querying user; receive a response to at least one of the one or more selection criteria and store the response in the electronic storage medium; prioritize the one or more selection criteria based on the response; search a set of social networks based on the set of goals and the prioritized selection criteria for a set of candidate users to collaborate with the querying user in achieving the one or more goals; and rank the set of candidate users based on a likelihood of each candidate user in the set of candidate users matching the set of goals and the response.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The word "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention recognize that, while many social networking websites may be successful in connecting users to one another, there are no mechanisms to link the users to achieve their common goals. Currently, if users want to utilize their networks to accomplish goals together, the users need to scan through contact lists, think about criteria to select or eliminate matches, contact other users, receive a confirmation, and then make an agreement to collaborate. Embodiments of the present invention recognize that these manual processes typically require substantial time, effort, and discipline from users. Even then, most users never move on to the next step in networking (i.e., harvesting their social networks to achieve their goals). Thus, the users' investment on social networking sites may be untapped. In addition, embodiments of the present invention also recognize that the manual process may also be unreliable, as it reflects ad-hoc thinking processes, and users may easily forget important factors to consider.

Embodiments of the present invention provide an approach for goal-based user matching among social networking environments. In a typical embodiment, a querying user is asked to respond to a series questions related to goals, criteria, and criteria priorities (and, optionally, a desired "degree" of separation among other users). The querying user will submit his/her responses, which are then parsed and prioritized accordingly. Based on the responses, social networking sites are then searched to identify a set (e.g., at least one) of candidate users that are potential collaboration partners with the querying user. This set of candidate users may be arranged in a list or the like and sorted according to a best match to the querying user's responses. The list can then be provided to the querying user. In addition, invites can be sent to the set of candidate users to invite such users to connect/collaborate with the querying user.

Among other things, the embodiments of the present invention derive goals and evaluation criteria based on community and personal information, such as profiles and tags, which are stored at community and individual levels. This approach allows users to directly enter their profile into the system, or pull/crawl their profile data from other systems (e.g., social networking systems). As will be described below, the system will obtain goals (e.g., by filling in blanks, selection from a predefined list, etc.), criteria, and priorities (e.g., through a question-and-answer format, by selection from a predefined criteria list, etc.) from a querying/end user. In the case of the former, the system may ask users questions such as: What is your goal? What are your criteria? How important is each criterion on selecting users?, etc. The user will provide responses in text-based or audio-based inputs. In addition, the end/querying user may specify a degree of extended network. Along these lines, the immediate network is the 1$^{st}$ degree of network, and the network's network is the 2$^{nd}$ degree of network. Regardless, the criteria can be quantified by weighting each response, and prioritized accordingly. Based on the prioritized responses, a search will be conducted of communities, user profiles, and tags of social networking sites to identify a set of candidate users to collaborate with the querying user. The set of candidate users can be ranked in a list based on the user criteria weighting, and have a score assigned thereto (e.g., reflecting a percentage match to the querying user's goals, criteria, etc.). The list can be returned to the querying user and can include a reason as to why each candidate user was identified. Thereafter, the system can send invites to the candidate users.

Figure 1:
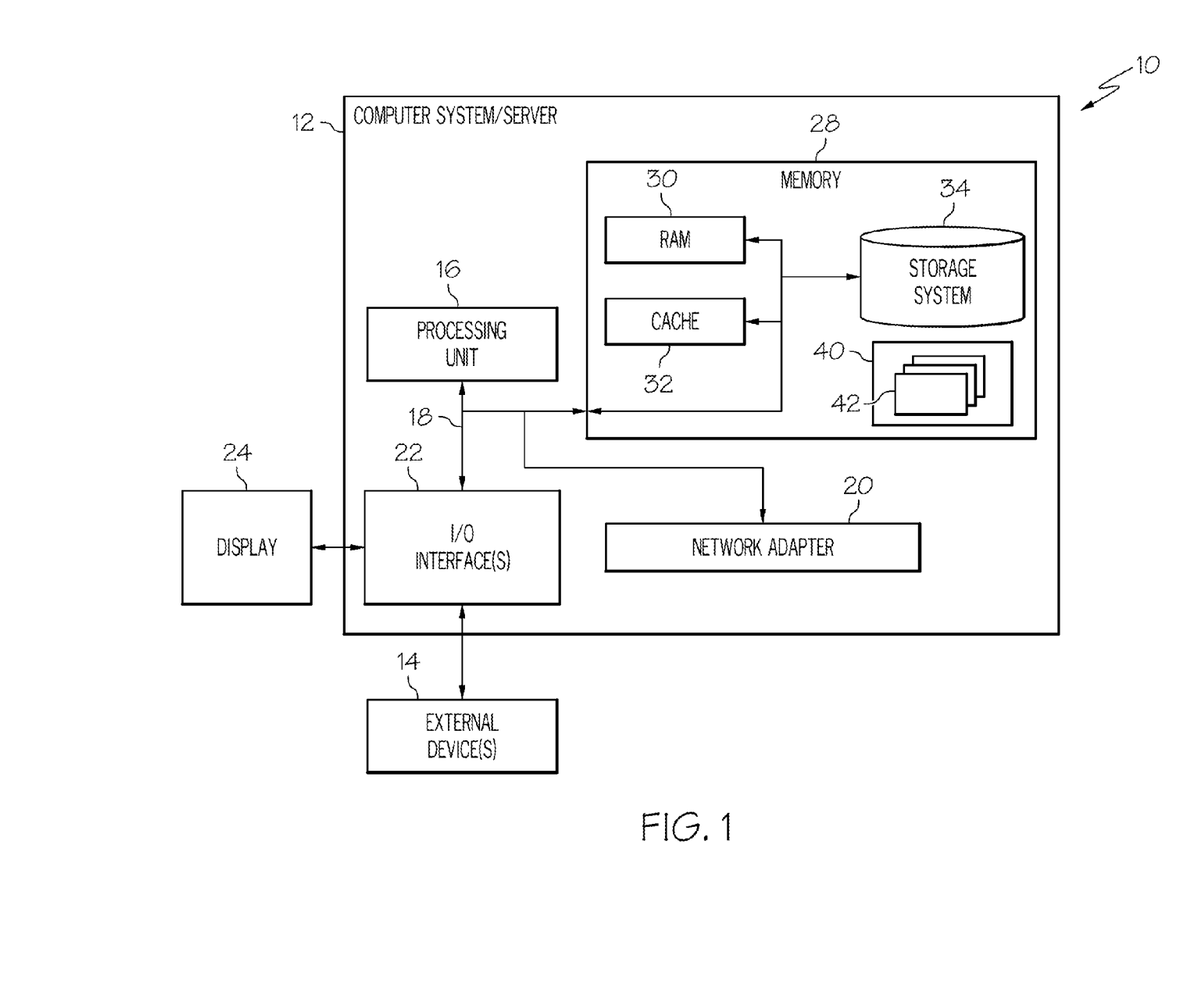
FIG. 1 depicts a computing node according to an embodiment of the present invention.

FIG. 1 depicts a computing node according to an embodiment of the present invention. Computing node 10 is only one example of a suitable structure computing node and is not intended to suggest any limitation as to the scope of use or functionality of embodiments of the invention described herein. Regardless, computing node 10 is capable of being implemented and/or performing any of the functionality set forth hereinabove.

In computing node 10, there is a computer system/server 12, which is operational with numerous other general purpose or special purpose computing system environments or configurations. Examples of well-known computing systems, environments, and/or configurations that may be suitable structure for use with computer system/server 12 include, but are not limited to, personal computer systems, server computer systems, thin clients, thick clients, handheld (e.g., tablet) or laptop devices, mobile devices, global positioning systems (GPS), GPS-enable devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 12 may be described in the general context of computer system-executable structure instructions, such as program modules, being executed by a computer system. Generally, program modules may include routines, programs, objects, components, logic, data structures, and so on, which perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to one or more processors 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media (e.g., computer-readable tangible storage device(s)) that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electromagnetic, optical, or any suitable structure combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable structure combination of the foregoing.

In one embodiment, user matching program/utility 40, having a set (at least one) of program modules 42, as well as an operating system, one or more application programs, other program modules, may be stored on at least one of one or more computer-readable tangible storage devices of computer system/server 12 for execution by at least one of one or more processors 16. In another embodiment, user matching program/utility 40, having a set (at least one) of program modules 42, as well as an operating system, one or more application programs, other program modules, may be stored on at least one of one or more computer-readable tangible storage devices of computer system/server 12 for execution by at least one of one or more processors 16 via at least one of one or more computer-readable memories (e.g., RAM 30 and cache memory 32). Program data may be stored in memory 28 or any other computer-readable tangible storage devices of computer system/server 12, by way of example, and not limitation.

Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

As indicated above, embodiments of the present invention provide an approach for goal-based user matching among social networking environments. Specifically, a system according to an embodiment of the present invention may derive goals and evaluation criteria based on community and personal information, such as profiles and tags, which are stored at community and individual levels. This approach allows users to directly enter their profile into the system, or pull/crawl their profile data from other systems (e.g., social networking systems). As will be described below, the system will obtain goals (e.g., by filling in blanks, selection from a predefined list, etc.), criteria, and priorities (e.g., through a question-and-answer format, by selection from a predefined criteria list, etc.) from a querying/end user. In the case of the former, the system may ask users questions such as: What is your goal? What are your criteria? How important is each criterion on selecting users?, etc. The user will provide responses in text-based or audio-based inputs. In addition, the end/querying user may specify a degree of extended network. Along these lines, the immediate network is the $1^{st}$ degree of network, and the network's network is the $2^{nd}$ degree of network. Regardless, the criteria can be quantified by weighting each response, and prioritized accordingly. Based on the prioritized responses, a search will be conducted of communities, user profiles, and tags of social networking sites to identify a set of candidate users to collaborate with the querying user. The set of candidate users can be ranked in a list based on the user criteria weighting, and have a score assigned thereto (e.g., reflecting a percentage match to the querying user's goals, criteria, etc.). The list can be returned to the querying user and can include a reason as to why each candidate user was identified. Thereafter, the system can send invites to the candidate users.

Figure 2:
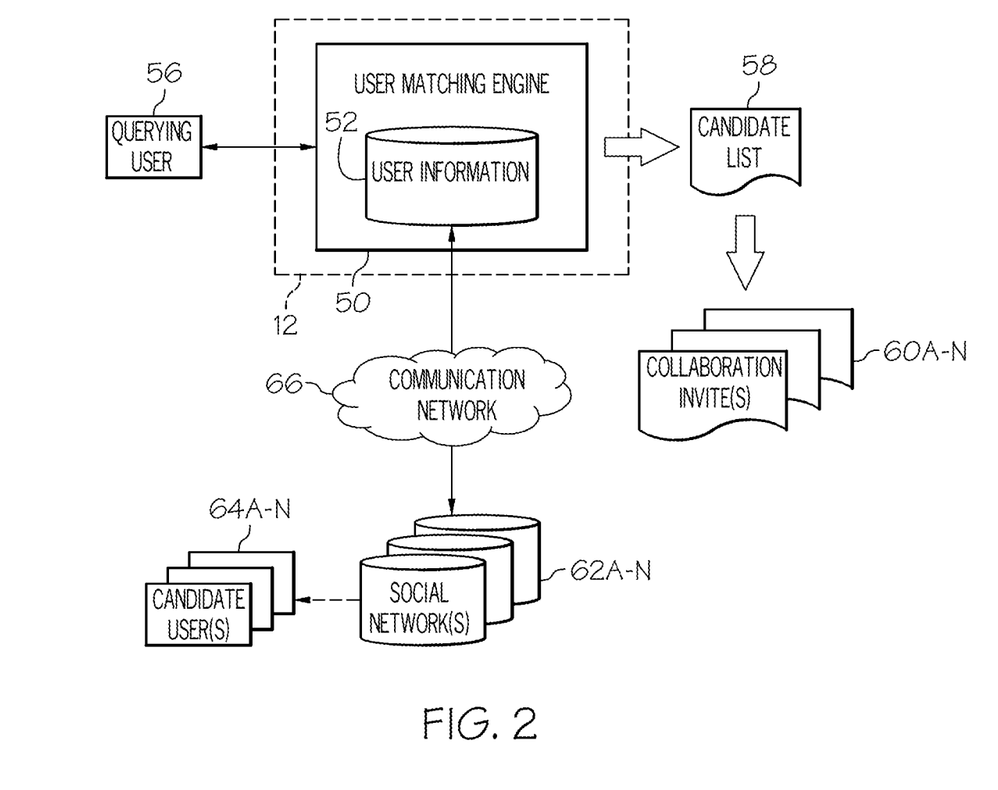
FIG. 2 depicts a system diagram according to an embodiment of the present invention.

Referring now to FIG. 2, FIG. 2 depicts a system diagram according to an embodiment of the present invention. It is understood that the teachings recited herein may be practiced within a networked computing environment (e.g., a cloud computing environment). A stand-alone computer system/server 12 is shown in FIGS. 1 and 2 for illustrative purposes only. In the event the teachings recited herein are practiced in a networked computing environment, each client need not have engine 50. Rather, engine 50 could be loaded on a server or server-capable device that communicates (e.g., wirelessly) with the clients to provide device protection therefor. Regardless, as depicted, a user matching engine (engine 50) is shown within computer system/server 12. In general, engine 50 can be implemented as user matching program/utility 40 on computer system 12 of FIG. 1 and can implement the functions recited herein.

Along these lines, engine 50 may perform multiple functions similar to a general-purpose computer. Among other functions, engine 50 may: receive a profile for a querying user 56 from querying user 56 and/or from a set of social networks 62A-N to which querying user 56 belongs and store the profile in an electronic storage medium 52; receive one or more goals from a querying user 56 and store the one or more goals in an electronic storage medium 52; provide one or more selection criteria to the querying user 52; receive a response to at least one of the one or more selection criteria and store the response in electronic storage medium 52; receive a desired degree of social network separation (e.g., of the set of candidate users 64A-N from the querying user 56 and/or of set of social networks 62A-N from one another as a whole); weight and/or prioritize the one or more selection criteria relative to one another based on the response; search a set of social networks 62A-N via communication network(s) 66 based on the set of goals, the prioritized selection criteria, and/or desired degree of separation for a set of candidate users 64A-N to collaborate with the querying user 56; rank the set of candidate users 64A-N in a list 58 or the like (shown as output for illustrative purposes) based on a likelihood of each of the set of candidate users 64A-N matching the set of goals and the response; send list 58 to querying user 56; send a set of collaboration invites 60A-N (shown as output for illustrative purposes) to the set of candidate users 64A-N and/or connect the querying user 56 and at least one of the set of candidate users 64A-N in response to the sending of the set of collaboration invites 60A-N (and their acceptance by the associated users).

Illustrative Example

Figure 3:
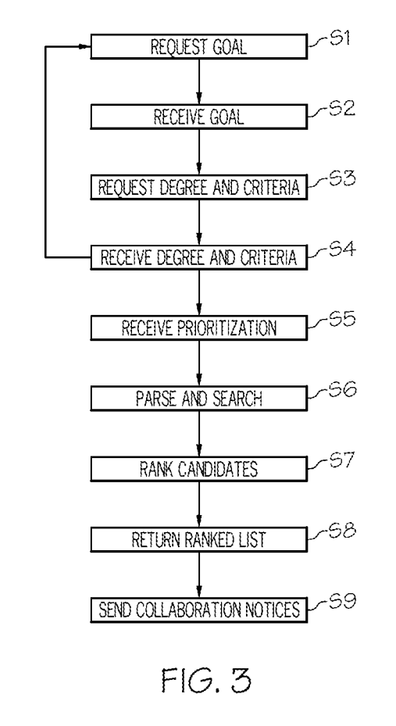
FIG. 3 depicts a method flow diagram according to an embodiment of the present invention.

Referring now to FIG. 3, FIG. 3 depicts a method flow diagram according to an embodiment of the present invention. It is understood that in this flow, it is assumed that the user has logged into a secured session of a system comprising engine 50 of FIG. 2.

In step S1, engine 50 asks about the user's goal. Alternatively, the goals could be extracted from other systems (e.g., personal business commitment from a corporate system). In step S2, the user provides the goal, (e.g., "file a patent" or "present in a DB2 conference") and indicates if it is a professional or personal goal, and engine 50 receives the goal and the indication. In step S3, engine 50 asks the user for the desired degree of social network separation and the selection criteria (e.g., expertise, experience, company, etc.) for potential collaborators. In step S4, the user provides the desired degree of social network separation and answers to the selection criteria, etc. (in so doing, the user can optionally skip any of the criteria), and engine 50 receives the desired degree of social network separation and the answers to the selection criteria. Steps 1 to 4 can iterate as many times as needed. The user can go back and modify answers at any time prior to submission of the search. In any event, in step S5, the user prioritizes the final list of selection criteria with a total weight of 100. The user can also make any criteria into an absolute condition (e.g., the candidates have to fulfill this criterion). Alternatively, the user can skip the prioritization, and all criteria are considered equally. In step S6, engine 50 parses user text into words or phrases and performs a search against profiles and tags stored in social networking sites. In step S7, engine 50 aggregates and ranks candidates found during the search based on the user criteria weighting and assigns a score or percentage of matching likelihood to each candidate. In step S8, engine 50 returns a ranked list of candidates and may also list the reasons these candidates are picked and ranked. In step S9, engine 50 may optionally send collaboration invites on behalf of the user to candidates.

As an illustrative example, assume that a user wishes to find some collaborators on publishing articles on chemical compounds. The user logs onto a system comprising engine 50 and engine 50 asks what the goal is. Assume that the user's answer is to "publish articles" as a professional goal. Based on the predefined criteria associated with the professional goals, engine 50 may then ask the user to what degree of social network separation the user wants to limit the search. Assume that the user's answer is $2^{nd}$ degree (the user's networks' network). Engine 50 will then ask the user what expertise the user requires in candidates, and the answer is "chemistry". The user will then identify that this criteria is an absolute criterion. Thereafter, engine 50 will ask the user what experience the user requires in candidates, and the answer is "publish articles". Engine 50 may then ask the user if any other criteria are important for his/her consideration. Assume that the user indicates that he/she would like to work with collaborators in Company "A".

Once all the criteria are chosen, assume that the user prioritizes the criteria, giving the experience the weight of 60, and the company has the weight of 40. Engine 50 will perform a search against user profiles and tags stored within the system and external data stored in social networking sites.

Figure 4:
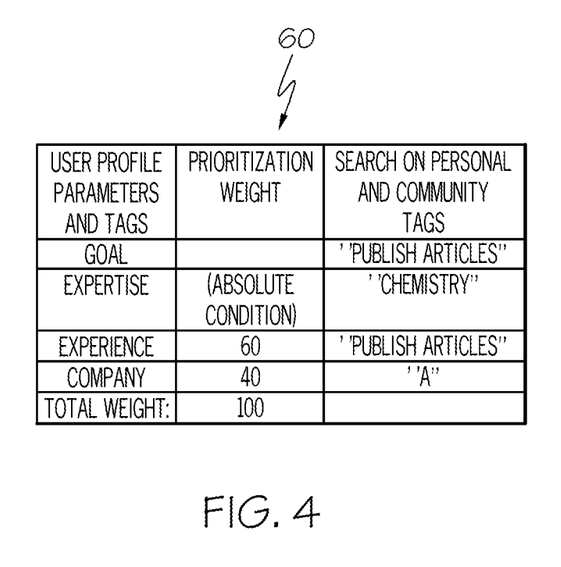
FIG. 4 depicts an illustrative decision table according to an embodiment of the present invention.

FIG. 4 depicts an illustrative decision table according to an embodiment of the present invention. The sample decision table 60 of FIG. 4 shows how engine 50 will use the information to search and evaluate the weighting. Specifically, decision table 60 includes columns for: "User Profile Parameters and Tags," "Prioritization Weight," and "Search on Personal and Community Tags." Moreover, columns are provided for "Goal," Expertise," "Experience," "Company" and "Total Weight." As shown, the "Expertise" was listed as an absolute condition, "Experience" was weighted as 60, while "Company" was weighted as 40 (for a "Total Weight" of 100). Moreover, the goal is listed as "Publish Articles". Based on this goal and the criteria, engine 50 conducts the search using the keywords of "Chemistry," "Publish Articles," and "Company A".

Figure 5:
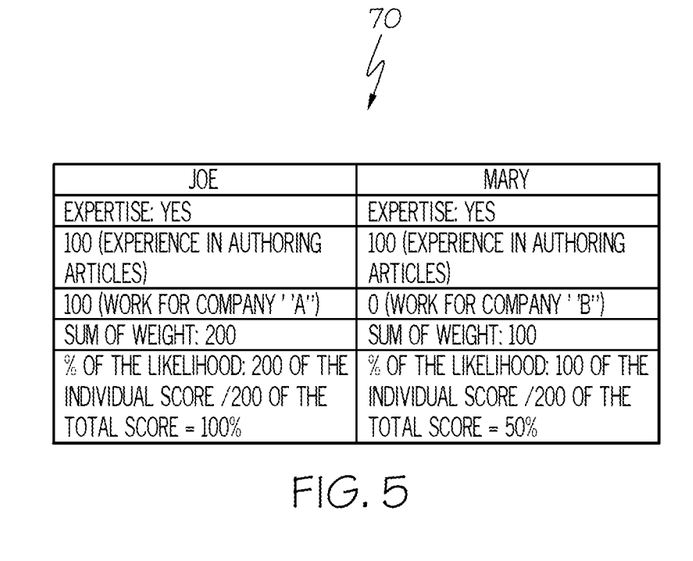
FIG. 5 depicts an illustrative results table according to an embodiment of the present invention.

FIG. 5 depicts an illustrative results table according to an embodiment of the present invention. After engine 50 conducts the search using the keywords of "Chemistry," "Publish Articles," and "Company A", engine 50 will order the returned result list based on the priority weighting and return a list of candidates with the ranking based on likelihood of matching. An example of this output is shown table 70. For example, engine 50 returned two users from the search. Engine 50 listed Joe in front of Mary because Joe works for company "A", while Mary works for company "B", even though they both have expertise in chemistry and publication experience. As shown, engine 50 gave both Joe and Mary a weight of 100 for "Experience." However, for "Company", engine 50 gave Joe a weight of 100, while engine 50 gave Mary a weight of 0. Thus, engine 50 calculated Joe's total weight as 200, while engine 50 calculated Mary's total weight as 100. This resulted in engine 50 calculating a total score of 200/200, or 100%, for Joe, and 100/200, or 50%, for Mary.

While shown and described herein as a goal-based user matching system, it is understood that the invention further provides various alternative embodiments. For example, in one embodiment, the invention provides a computer-readable/useable medium that includes computer program code to enable a computer infrastructure to provide goal-based user matching functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable structure storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide goal-based user matching functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for goal-based user matching. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable structure for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for matching users among a computerized network, the method comprising:
    a processor receiving one or more goals from a querying user and storing the one or more goals in an electronic storage medium;
    the processor receiving one or more selection criteria from the querying user, the selection criteria relating to attributes of a desired set of candidate users to collaborate with the querying user;
    the processor receiving, from the querying user, a desired degree of social network separation between the querying user and the desired set of candidate users to collaborate with the querying user in achieving the one or more goals;
    the processor storing the one or more selection criteria in the electronic storage medium;
    the processor weighting one or more selection criteria relative to one another;
    the processor prioritizing the one or more selection criteria based on a corresponding weight derived from the weighting;
    the processor searching a set of social networks based on the set of goals, the desired degree of social network separation, and the prioritized selection criteria, for a set of candidate users; and
    the processor ranking the set of candidate users based on a likelihood of each candidate user in the set of candidate users matching the set of goals and the set of criteria;
    wherein the desired degree of social network separation comprises a numerical indicator of a maximum number of connected nodes between a node corresponding to the querying user and a set of nodes corresponding to the set of candidate users.

2. The method of claim 1, further comprising the processor identifying the set of social networks based on the desired degree.

3. The method of claim 1, further comprising the processor sending a list identifying the set of candidate users to the querying user.

4. The method of claim 1, further comprising sending a collaboration invitation to at least one candidate user in the set of candidate users.

5. The method of claim 4, further comprising the processor connecting the querying user and the least one candidate user.

6. The method of claim 5, wherein the connecting is executed in response to the sending of the set of collaboration invites.

7. The method of claim 1, wherein a solution service provider provides a computer infrastructure operable to perform the method.

8. A system for matching users among social networking environments, the system comprising:
    a bus;
    a computer-readable storage device coupled to the bus;
    a processor coupled to the bus;
    program instructions, stored on the computer-readable storage device for execution by the processor, to receive one or more goals from a querying user and storing the one or more goals in an electronic storage medium;
    program instructions, stored on the computer-readable storage device for execution by the processor, to receive one or more selection criteria from the querying user, the selection criteria relating to attributes of a desired set of candidate users to collaborate with the querying user;
    program instructions, stored on the computer-readable storage device for execution by the processor, to receive from the querying user, a desired degree of social network separation between the querying user and the desired set of candidate users to collaborate with the querying user in achieving the one or more goals;
    program instructions, stored on the computer-readable storage device for execution by the processor, to store the one or more selection criteria in the electronic storage medium;
    program instructions, stored on the computer-readable storage device for execution by the processor, to weight one or more selection criteria relative to one another;
    program instructions, stored on the computer-readable storage device for execution by the processor, to prioritize the one or more selection criteria based on a corresponding weight derived from the weighting;
    program instructions, stored on the computer-readable storage device for execution by the processor, to search a set of social networks based on the set of goals, the desired degree of social network separation, and the prioritized selection criteria, for a set of candidate users; and
    program instructions, stored on the computer-readable storage device for execution by the processor, to rank the set of candidate users based on a likelihood of each candidate user in the set of candidate users matching the set of goals and the set of criteria;
    wherein the desired degree of social network separation comprises a numerical indicator of a maximum number of connected nodes between a node corresponding to the querying user and a set of nodes corresponding to the set of candidate users.

9. The system of claim 8, further comprising program instructions, stored on the computer-readable storage device for execution by the processor, to identify the set of social networks based on the desired degree.

10. The system of claim 8, further comprising program instructions, stored on the computer-readable storage device for execution by the processor, to send a list identifying the set of candidate users to the querying user.

11. The system of claim 8, further comprising program instructions, stored on the computer-readable storage device for execution by the processor, to send a collaboration invitation to at least one candidate user in the set of candidate users.

12. The system of claim 11, further comprising program instructions, stored on the computer-readable storage device for execution by the processor, to connect the querying user and the least one candidate user in response to the sending of the set of collaboration invites.

13. A computer program product for matching users among social networking environments, the computer program product comprising:

a computer-readable storage device;

program instructions, stored on the computer-readable storage device, to receive one or more goals from a querying user and storing the one or more goals in an electronic storage medium;

program instructions, stored on the computer-readable storage device, to receive one or more selection criteria from the querying user, the selection criteria relating to attributes of a desired set of candidate users to collaborate with the querying user;

program instructions, stored on the computer-readable storage device to receive, from the querying user, a desired degree of social network separation between the querying user and the desired set of candidate users to collaborate with the querying user in achieving the one or more goals;

program instructions, stored on the computer-readable storage device, to store the one or more selection criteria in the electronic storage medium;

program instructions, stored on the computer-readable storage device, to weight one or more selection criteria relative to one another;

program instructions, stored on the computer-readable storage device, to prioritize the one or more selection criteria based on a corresponding weight derived from the weighting;

program instructions, stored on the computer-readable storage device, to search a set of social networks based on the set of goals, the desired degree of social network separation, and the prioritized selection criteria, for a set of candidate users; and program instructions, stored on the computer-readable storage device, to rank the set of candidate users based on a likelihood of each candidate user in the set of candidate users matching the set of goals and the set of criteria;

wherein the desired degree of social network separation comprises a numerical indicator of a maximum number of connected nodes between a node corresponding to the querying user and a set of nodes corresponding to the set of candidate users.

14. The computer program product of claim 13, further comprising program instructions, stored on the computer-readable storage device, to identify the set of social networks based on the desired degree.

15. The computer program product of claim 13, further comprising program instructions, stored on the computer-readable storage device, to send a list identifying the set of candidate users to the querying user.

16. The computer program product of claim 13, further comprising program instructions, stored on the computer-readable storage device, to send a collaboration invitation to at least one candidate user in the set of candidate users.

17. The computer program product of claim 16, further comprising program instructions, stored on the computer-readable storage device, to connect the querying user and the least one candidate user in response to the sending of the set of collaboration invites.

* * * * *